May 23, 1972 J. MENERET 3,664,651
DEVICE FOR INITIATING AN EXOTHERMIC REACTION
Filed May 1, 1969 2 Sheets-Sheet 1

INVENTOR

JEAN MENERET

BY

Craig, Antonelli, Stewart & Hill ATTORNEYS

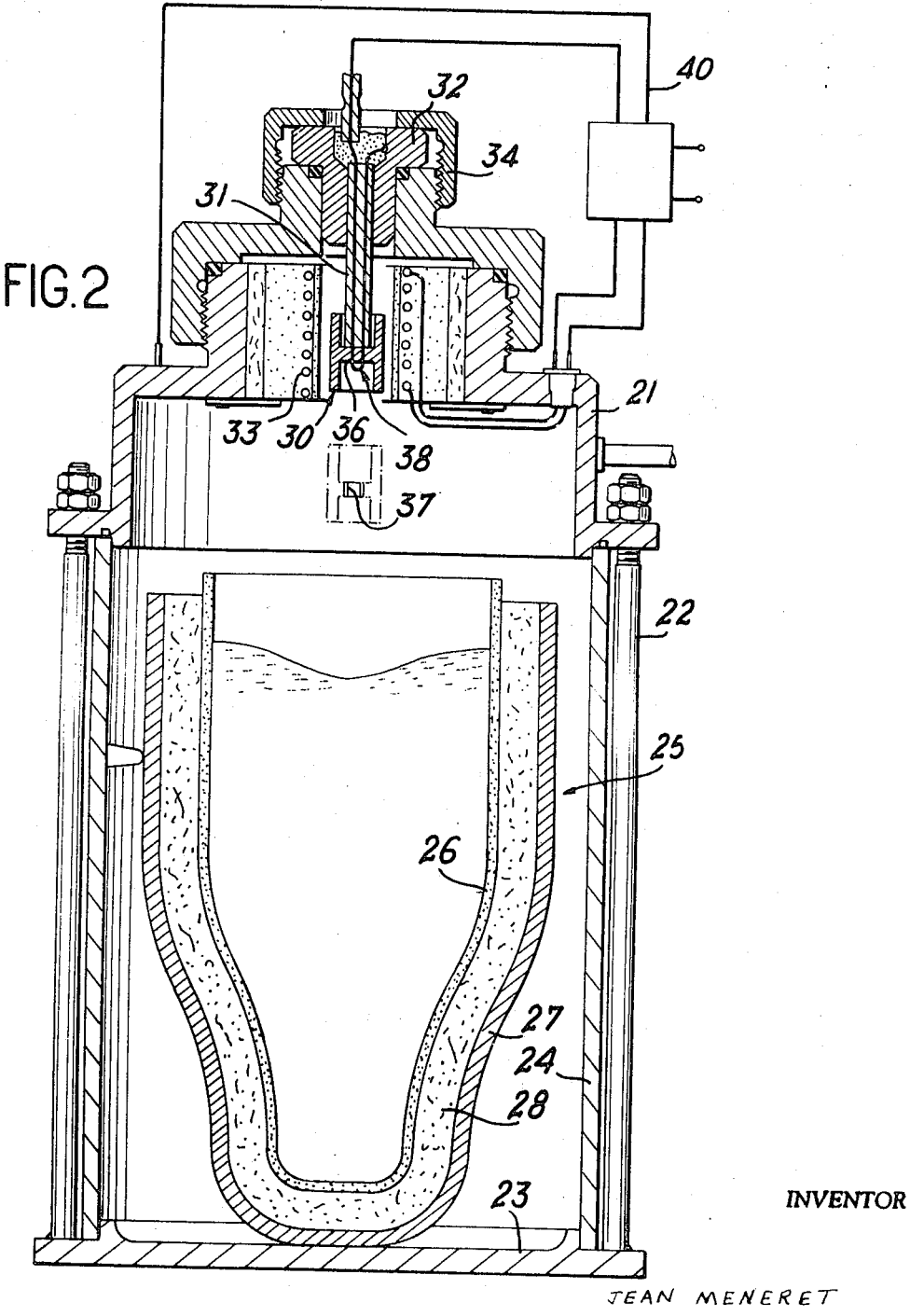

United States Patent Office 3,664,651
Patented May 23, 1972

3,664,651
DEVICE FOR INITIATING AN
EXOTHERMIC REACTION
Jean Meneret, Sevres, France, assignor to Comissariat a l'Energie Atomique et Societe Desmarquest SA, Paris and Sevres, France
Filed May 1, 1969, Ser. No. 820,734
Claims priority, application France, May 9, 1968, 151,093
Int. Cl. C21d 1/34
U.S. Cl. 266—1
7 Claims

ABSTRACT OF THE DISCLOSURE

An exothermic reaction in a reactional mass is initiated by dropping under the action of gravity a block of refractory material which has previously been suspended above the reactional mass and heated to a predetermined temperature which is sufficient to start the reaction as the refractory block comes into contact with the reactional mass.

---

This invention is directed to a method and to a device for starting an exothermic reaction. The invention is primarily applicable to the start-up of calciothermic or magnesiothermic reactions which take place in the manufacture of uranium or plutonium metal.

It is known that uranium and plutonium are usually prepared in the state of pure metal by calciothermic or magnesiothermic reduction of their respective fluorides. For example, in the case of calciothermic redutcion, the fluoride is mixed with calcium and the reactional mass of the mixture which is thus obtained and introduced in a suitable crucible under a reduced pressure of inert gas is heated to a sufficient temperature to cause the reaction. The reaction leads to the formation of calcium fluoride which constitutes the slag whilst the molten metal is collected at the bottom of the crucible. The reaction is highly exothermic and local heating may be sufficient to produce this reaction.

Heating of the reactional mass is ordinarily carried out by means of the induction process in which the crucible is surrounded by an inductor coil. A very high input power is required before starting the reaction in an apparatus of this type and is largely unnecessary. The crucible is necessarily preheated at the same time as the reactional mass as well as the shielding elements which usually surround the crucible; the heat evolved in the reaction then causes a further temperature rise which is liable to result in damage both to the crucible and to the shielding. A further disadvantage of this device lies in the fact that it calls for a complex installation which is both costly and cumbersome. Moreover, the temperature obtained at the moment of start-up of the reaction cannot be controlled with accuracy.

It has proved possible to circumvent some of the foregoing disadvantages by placing within the reactional mass itself a heating resistor which is supplied with electric current from the exterior of the installation. As a result of the local heating which is achieved in this manner, the temperature at the time of commencement of the reaction can accordingly be defined with greater accuracy. On the other hand, this device has the disadvantage of introducing within the mixture a foreign metal which affects the purity of the end product.

In order to avoid the presence of this impurity, it has also been proposed to feed into the same reactional mass a small quantity of a mixture which has the same composition and with which the reaction is initiated. The means employed for starting this reaction consist of a complex percussion-type mechanical system which suffers from the disadvantage of unreliable operation. Furthermore, the temperature attained in this process cannot readily be controlled.

The aim of the present invention is to provide a method and device for starting an exothermic reaction which meet practical requirements more effectively than the expedients proposed in the prior art, especially insofar as accurate maintenance of a well-determined temperature is ensured at the time of start-up of the reaction by means of a simple and compact device which is both reliable in operation and easy to control. Further advantages of the invention lie in the fact that power consumption is negligible and that the crucible as well as any shielding elements surrounding this latter are no longer heated prior to the reaction.

According to the method proposed by the invention, a refractory material which is initially suspended above the reactional mass and heated to a sufficient temperature to start the reaction is allowed to fall under the action of gravity until said material comes into contact with said mass.

The device in accordance with the invention is essentially characterized in that it comprises a rod from which a block of refractory material is suspended above the reactional mass, means for retaining the refractory block on said rod and formed of a material which is capable of melting at a predetermined temperature and a furnace for heating said refractory block and said retaining means to a sufficient temperature to cause either by melting or softening of said retaining means the release of the heated refractory block followed by falling of said block into said reactional mass.

The term "rod" as used in the foregoing must be understood to have a very wide meaning which includes, for example, ordinary wires whether rigid or not as well as rigid rods.

According to a secondary feature of the invention, the device comprises means for automatically controlling the heating furnace and for stopping the heating as soon as the refractory block has fallen.

Further properties will become apparent from the following description which relates to particular examples of application of the invention. Reference is made to FIGS. 1 and 2 of the accompanying drawings, in which:

FIG. 2 illustrates a second embodiment of the device according to the invention.

Figure 1:
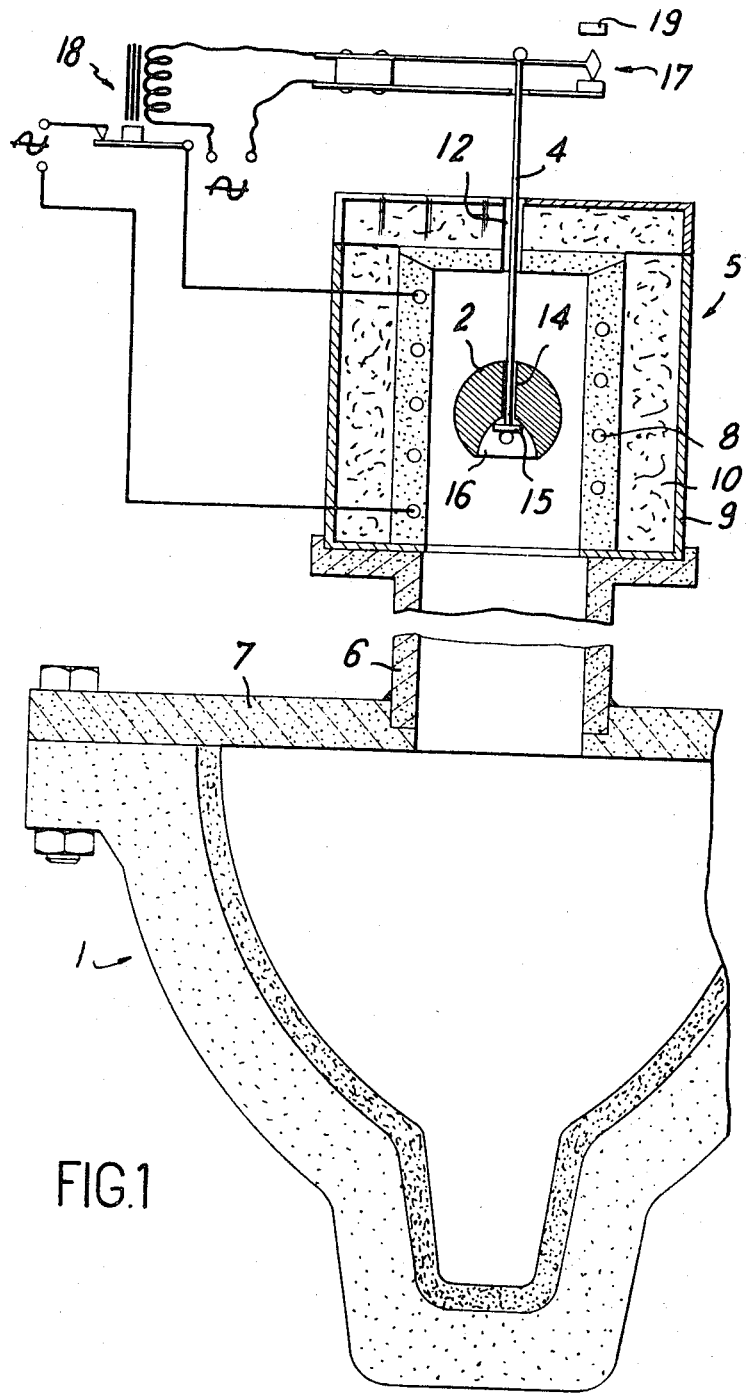
FIG. 1 is a fragmentary vertical sectional view of a first embodiment of the device.

In the embodiment herein described, the invention is carried into practice for the purpose of starting the reaction involved in the preparation of uranium or plutonium metal by calciothermic reduction of fluorides. The reactional mass is placed in the crucible 1 within a vessel subjected to a partial pressure of inert gas (argon) and consists of a mixture of uranium or plutonium fluoride with calcium.

The device of FIG. 1 comprises a block or spherule 2 which is suspended within a heating furnace 5 from a rod which consists in this example of a simple wire 4. The lower end of the furnace 5 is connected by means of a guide tube 6 to the cover-plate 7 of the crucible.

The heating furnace employed is an electric heating furnace which operates on the Joule-effect principle and comprises a heating resistor 8 surrounding a cylindrical cavity in which the spherule 2 is placed above the reactional mass. A mass 9 of insulating refractory fiber is placed between said resistor and a metal casing 10. The top wall of the furnace is pierced by an opening 12 providing a through-passage for the wire 4.

The block 2 or spherule is formed of a refractory material which has sufficiently high heat resistance to be brought to the temperature required for starting the reaction of the mass which is placed within the crucible 1. In the particular case of the reaction under consideration, the spherule is preferably formed of calcium fluoride, that is to say of a material having the same composition as the slag produced by the reaction. This avoids any introduction of additional impurity in the end products.

The spherule 2 is pierced by a bore 14 and is thus permitted to slide along the wire 4. However, the spherule is stopped by a split washer 15 placed on a button-head which terminates the wire 4. Said washer has a diameter which is larger than the diameter of the bore 14 and is formed of a material which is capable of melting at the temperature of start-up of the reaction. In the particular case considered, the washer is preferably formed of gold since the melting point of this metal is 1063° C. By way of alternative, it would be possible to make use of a washer of silver or of silver-gold alloy.

As appears from FIG. 1, the bore 14 of the spherule opens at the lower end into a cavity 16 which is capable of containing the washer 15 so that, in the position which is illustrated, the material of the spherule is located between the heating furnace and the washer 15 and consequently prevents this latter from being heated at a higher rate than the spherule itself.

The wire 4 is formed of a metal such as platinum, for example, which does not melt at the temperatures employed. Said wire is suspended above the furnace 5 by means of a terminal button-head which rests on the movable arm of a contact for the automatic control of the furnace. When the wire is loaded by the spherule, the contact is closed and results in firing of the furnace by means of the relay 18.

After a few minutes of heating, the spherule and the washer are heated to the melting temperature of the gold. The gold washer 15 then melts or at least is softened and closes over the end of the wire 4. The spherule 2 is thus released and falls into the reactional mass contained within the crucible 1 while being guided during its fall by the tube 6. Said tube 6 is formed of a material which affords good resistance to thermal shock and has low heat conductivity in order to prevent cooling of the spherule during its fall.

As soon as the spherule is released and the wire is no longer loaded, the contact 17 opens and stops the heating of the furnace. At the same time, said contact actuates another contact 19, thereby producing a signal for warning the operators that the spherule has dropped.

In accordance with the foregoing description, the device according to the invention constitutes an assembly which is low in cost price and guarantees good operation by virtue of its simplicity of design. The device makes it possible to ensure that a well-determined reaction start-up temperature is accurately maintained, this condition being in turn conducive to high efficiency. Furthermore, there is no attendant danger of contamination of the metal which is prepared by means of the calciothermic reaction.

In a particular construction of the device described above, a calcium fluoride spherule 10 mm. in diameter has been employed with a gold washer 2 to 3 mm. in diameter and 0.05 mm. in thickness. The wire which was formed of platinum had a diameter of 0.2 mm. and was provided wtih two terminal button-heads having a diameter of 1 to 2 mm. The guide tube was fabricated from sintered fused silica.

FIG. 2 illustrates another embodiment of the device according to the invention which differs from the previous embodiment in the shape of the refractory block, in the manner in which said block is suspended above the crucible which contains the reactional mass and in the automatic control system which serves to stop the heating.

The application which is contemplated is the same as in the previous embodiment and the device according to the invention is again rigidly mounted in a cover-plate 21, said plate being removably fixed on columns 22 which are made integral with the base 23 of the calciothermic reduction unit. The device thus seals off the top end of a quartz cylinder 24 which contains the crucible 25.

In this example, the crucible 25 comprises an inner form 26 of small thickness made of calcium fluoride and an outer jacket 27 made of silica, a filling 28 of calcium fluoride powder being provided between the form 26 and the jacket 27. The lower portion of the inner form constitutes the ingot-mold in which the metal produced by means of the calciothermic reaction is collected.

As in the previous alternative embodiment, the refractory block of the starting device is formed of calcium fluoride so as to prevent the introduction within the reactional mass of impurities which are foreign to the slag produced by the reaction.

Prior to operation of the device, the refractory block 30 is suspended from the lower end of a refractory rod 31 which is formed in this case of alumina and rigidly fixed to a copper plug 32, the complete assembly being removable. Said assembly is positioned in the cover-plate 21 in such a manner as to ensure that the refractory block 30 comes into position with the furnace 33 which is rigidly fixed to said cover-plate and that the plug 32 provides a tight through-passage. The plug is tightly applied against the cover-plate 21 by means of a screw-cap 34.

The refractory block 30 is of cylindrical shape. In a plane which passes through the axis, said block has the shape of an H; in other words, the cylinder is hollow but has a transverse partition 36.

Said transverse partition is pierced by two apertures 37 serving as passageways for a wire 38. Said wire passes through two passageways formed longitudinally within the rod 31 and forms a loop beneath the partition 36 so as to retain the block which is suspended from the rod 31.

Above the transverse partition 36, the end of the suspension rod 31 is adapted to engage in the cylindrical block and to abut against the partition 36. The block is thus maintained substantially motionless with respect to the suspension rod. Above the same partition, the block protects the portion of the wire 38 which forms a loop and prevents heating of this latter at an excessive rate by the furnace 33.

At the time of operation of the device, the wire loop 38 which is heated by the furnace 33 melts at a predetermined temperature and then frees the hot refractory block 30 which falls into the reactional mass. The wire 38 is formed, for example, of a gold-palladium alloy.

The presence of an electrically-conducting wire which is chosen so as to permit suspension of the refractory block is turned to useful account in order to produce in addition the automatic interruption of the heating at the time of falling of the block. In fact, the meltable portion of the wire 38 is interposed in a relay circuit 40 which controls the electric circuit for supplying the heating resistor of the furnace 33. At the upper end of the rod 31, the two arms of the wire 38 are connected to this circuit, in one case through the ground of the screw-cap 32 and the cover-plate 21.

Melting of the loop formed by the wire 38 causes both the fall of the refractory block 30 and the disconnection of the relay circuit 40 which in turn causes disconnection of the supply circuit of the heating furnace.

What we claim is:

1. A device for initiating an exothermic reaction in a reactional mass and comprising a rod from which a block of refractory material is suspended above the reactional mass, means for retaining the refractory block on said rod and formed of a material which is capable of melting at a predetermined temperature and a furnace for heating said refractory block and said retaining means to a sufficient temperature to cause either by melting or softening of said retaining means the release of the heated refractory block followed by falling of said block into said reactional mass.

2. A device in accordance with claim 1, comprising means for automatically controlling the heating furnace in order to stop the furnace as soon as the refractory block has dropped.

3. A device in accordance with claim 1, wherein said refractory block has a bottom cavity for housing said means of meltable material and for protecting said means from heating at a higher rate than said block.

4. A device in accordance with claim 1, wherein said refractory block is slidably mounted on said suspension rod and said means are constituted by a washer abuttingly applied against the extremity of said rod.

5. A device in accordance with claim 1, wherein said suspension rod is attached to the movable arm of a contact for the automatic control of the heating furnace, said contact being closed as a result of the weight of the refractory block.

6. A device in accordance with claim 1, wherein meltable means are constituted by a portion of wire forming a loop around a portion of the refractory block.

7. A device in accordance wtih claim 6, wherein said portion of wire is interposed in a relay circuit for controlling the heating furnace so that disconnection of said relay circuit by melting of the wire results in stopping of the heating.

References Cited
UNITED STATES PATENTS

| | | | |
|---|---|---|---|
| 847,668 | 3/1907 | Lang | 266—1 X |
| 3,356,492 | 12/1967 | Delange et al. | 75—84.1 |

GERALD A. DOST, Primary Examiner

U.S. Cl. X.R.

75—84.1